US005661797A

United States Patent [19]
Leman et al.

[11] Patent Number: 5,661,797
[45] Date of Patent: Aug. 26, 1997

[54] HINGE MECHANISM FOR CELLULAR TRANSCEIVER HOUSING

[75] Inventors: Ari Leman, Euless; Morris Humphreys, Saginaw, both of Tex.; Bong Choon Park, Chang-Wan, Rep. of Korea

[73] Assignee: Nokia Mobile Phones Ltd., Salo, Finland

[21] Appl. No.: 551,375

[22] Filed: Nov. 1, 1995

[51] Int. Cl.⁶ .................................................. H04M 1/00
[52] U.S. Cl. .......................... 379/433; 379/428; 379/434
[58] Field of Search ................................. 379/433, 428; 16/2, 342, 335

[56] References Cited

U.S. PATENT DOCUMENTS

| | | | |
|---|---|---|---|
| 4,535,925 | 8/1985 | Ramey et al. | 227/55 |
| 4,897,873 | 1/1990 | Bentler et al. | 379/433 |
| 5,111,503 | 5/1992 | Takagi | 379/433 |
| 5,185,790 | 2/1993 | Mischneko | 379/433 |
| 5,257,310 | 10/1993 | Takagi et al. | 379/433 |
| 5,274,882 | 1/1994 | Persson | 16/303 |
| 5,335,274 | 8/1994 | Masuda et al. | 379/433 |

Primary Examiner—Krista M. Zele
Assistant Examiner—Taunya A. McCarty
Attorney, Agent, or Firm—Perman & Green, LLP

[57] ABSTRACT

A unique hinge construction is provided for pivotally connecting a cover to a main body of a transceiver. The main body comprises a base and upstanding sidewalls and an endwall. Movable between a closed position generally overlying the main body and an operative angularly disposed position, the cover includes a pair of spaced apart ears projecting from an end thereof, the ears having opposed key slots formed therein being aligned with opposed mounting bores in the sidewalls adjacent the endwall. A pair of hinge shafts are rotatably received in an associated one of the mounting bores in the sidewalls on the main body. Each hinge shaft includes a key member engageable with an associated one of the key slots in the opposed ears for rotation therewith and a central member having a uniformly contoured outer surface defined by elevationally opposed convex shaped lobes, laterally opposed concave shaped depressions, and smooth transition zones joining the lobes and said depressions. A pair of spring members, each having a convex shaped surface fixed to the main body are biased into engagement with the uniformly contoured outer surface of its associated shaft for maintaining the cover closed in one instance and in at least one operative position relative to the main body in another instance.

12 Claims, 3 Drawing Sheets

FIG. 1
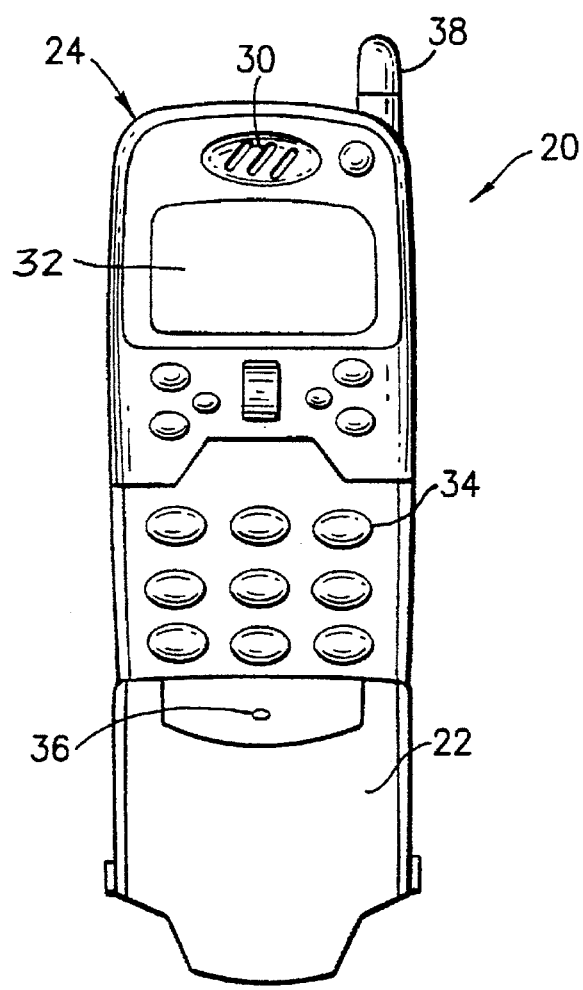
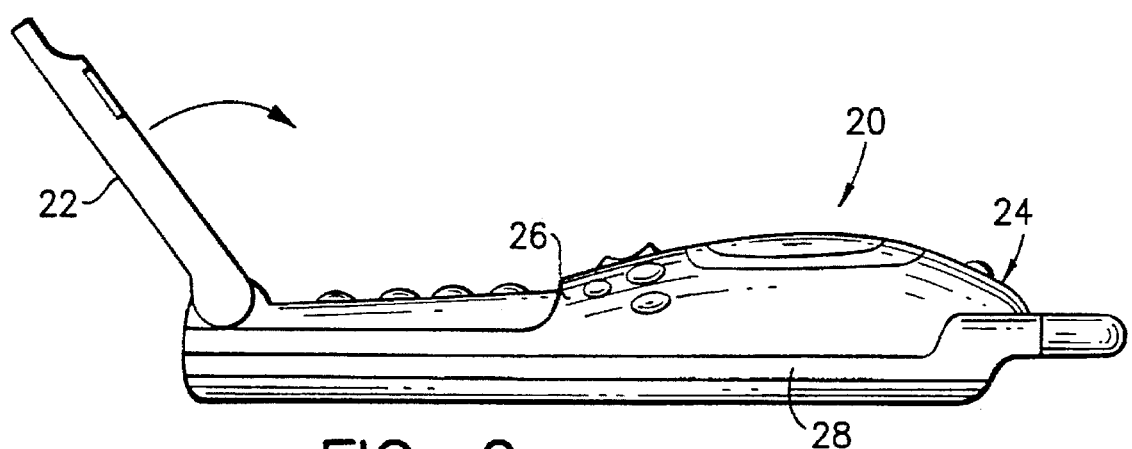
FIG. 2

FIG. 4
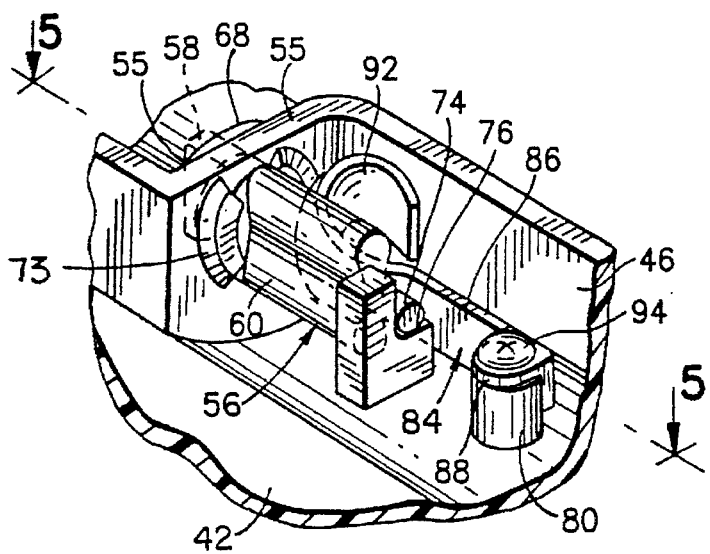
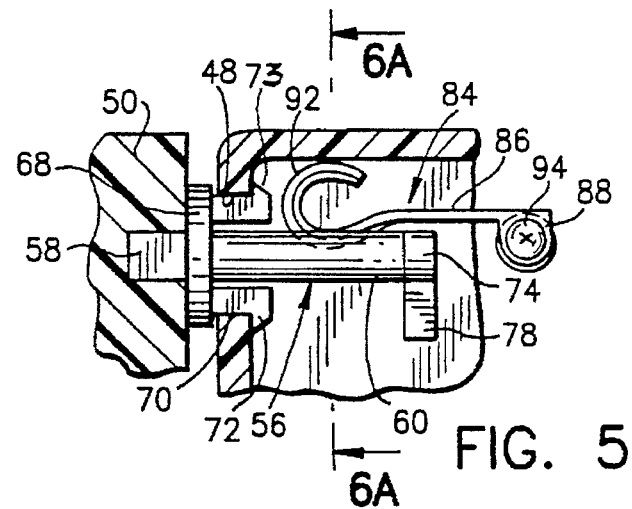
FIG. 5
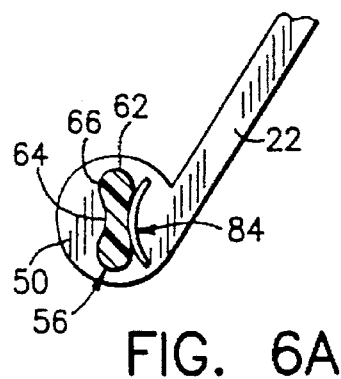
FIG. 6A
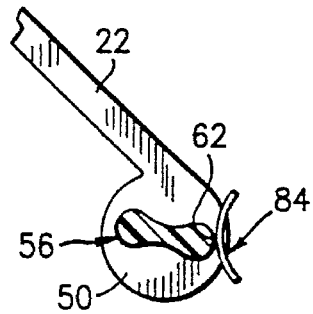
FIG. 6B
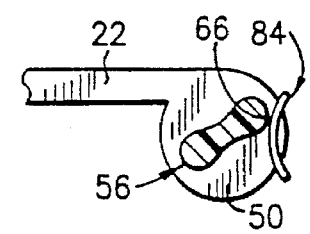
FIG. 6C

HINGE MECHANISM FOR CELLULAR TRANSCEIVER HOUSING

BACKGROUND OF THE INVENTION

1. Field of the Invention

This invention relates generally to hinged housings for miniaturized electronic equipment and more particularly to portable cellular transceivers which utilize hinged housings for folding elements.

2. Description of the Prior Art

An ultimate object of communication is, of course, to enable information to be transmitted or exchanged at once anytime, from anywhere, and by anybody. In addition to conventional intercommunication between fixed points, mobile communication has been gradually developed. Mobile communication means a communication between a mobile body such as ship, automobile or airplane (including a human being) and a fixed point such as home or office, and also means an intercommunication between two mobile bodies. In recent years, a portable telephone or a cordless telephone as a kind of means for carrying out the mobile communication has been extensively developed.

In general, a telephone is used with a receiver section put to the ear and a transmitter section kept near the mouth. So also in a portable telephone, it is necessary to ensure a sufficient distance between the receiver section and the transmitter section. In this circumstance, a conventional portable telephone itself is relatively long and large in size.

Telephones utilizing two housing elements, connected with some types of hinging mechanism, are common in wireline telephone sets and have become more common in landline wireless extension phones. This folding arrangement allows for the telephone to be more compact when the two housings are folded upon themselves.

Radiotelephones which utilize this type of design typically have most of the electronics within the larger of the two housings. For good acoustical performance, the cover must be held in an optimum position relative to the body and the cover helps direct sound pressure towards the microphone element.

Typical of known constructions are the disclosures in the following U.S. patents all disclose cooperating spring and cam assemblies associated with hinge constructions for a foldable telephone and associated door:

| U.S. Pat. No. | Inventor(s) | Issued |
| --- | --- | --- |
| 5,257,310 | Takagi et al. | 10/26/93 |
| 5,185,790 | Mischenko | 02/09/93 |
| 4,897,873 | Beutler et al. | 01/30/90. |

While each of the foregoing constructions represented advances in the state of the art at the time that they were introduced, it was in an effort to further improve upon those advancements that the present invention was conceived and has now been reduced to practice.

SUMMARY OF THE INVENTION

According to the present invention, a unique hinge construction is provided for pivotally connecting a cover to a main body of a transceiver. The main body comprises a base and upstanding sidewalls and endwalls. Movable between a closed position generally overlying the main body and an operative angularly disposed position, the cover includes a pair of spaced apart ears projecting from an end thereof, said ears having opposed key slots formed therein being aligned with opposed mounting bores in the sidewalls adjacent one of the endwalls. A pair of hinge shafts are rotatably received in an associated one of the mounting bores in the sidewalls on the main body. Each hinge shaft includes a key member engageable with an associated one of the key slots in the opposed ears for rotation therewith and a central member having a uniformly contoured outer surface defined by elevationally opposed convex shaped lobes, laterally opposed concave shaped depressions, and smooth transition zones joining the lobes and said depressions. A pair of spring members, each having a convex shaped surface fixed to the main body are biased into engagement with the uniformly contoured outer surface of its associated shaft means for maintaining the cover closed in one instance and in at least one operative position relative to the main body in another instance.

More specifically, the portable transceiver of the invention typically comprises a main body including a speaker, a microphone, and a keypad; a cover rotatably mounted to the main body, the cover covering at least the keypad section when the cover is in a closed condition; and a cover holding mechanism for rotatably holding the cover with respect to the main body, the cover holding mechanism including a biasing mechanism for exerting a biasing force to the cover so as to maintain the cover closed in one instance and, in another instance, at a stable position in a rotational direction when the cover is in an opened condition.

In using the transceiver of the invention, when the cover is opened, it is held in a stable position where the cover is inclined at a predetermined angle (e.g. 135°) with respect to the main body by the cover holding mechanism. In this stable position, the cover also functions as a voice reflecting and collecting board.

It is therefore, one object of the present invention to provide a moveable joint for connecting the cover to the main body of a transceiver.

It is a further object of the present invention to produce a more defined feeling for the user when the cover is opened or closed.

It is still a further object of the invention to provide a hinge mechanism for the cover of a transceiver which can be easily operated in a substantially fail-safe manner.

It is still another object of the invention to provide such a hinge mechanism which is of simplified design, uses readily available materials, and can be inexpensively manufactured and maintained.

Accordingly, these and other objects are realized in the present invention which encompasses a portable transceiver having a main housing and an attached movable cover utilizing a minimum of parts as described herein.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 1 is a plan view of a portable transceiver according to a preferred embodiment of the present invention;

FIG. 2 is a side view of FIG. 1;

FIG. 4 is a detail perspective view of assembled components illustrated in FIG. 3;

FIG. 5 is a cross section view taken along line 5—5 in FIG. 4;

FIG. 6A is cross section view taken along line 6A—6A in FIG. 6 to illustrate one relative position of movable components; and FIGS. 6B and 6C are cross section views, similar to FIG. 6A illustrating other successive relative positions of the movable components.

DETAILED DESCRIPTION OF THE PREFERRED EMBODIMENT

Figure 3:
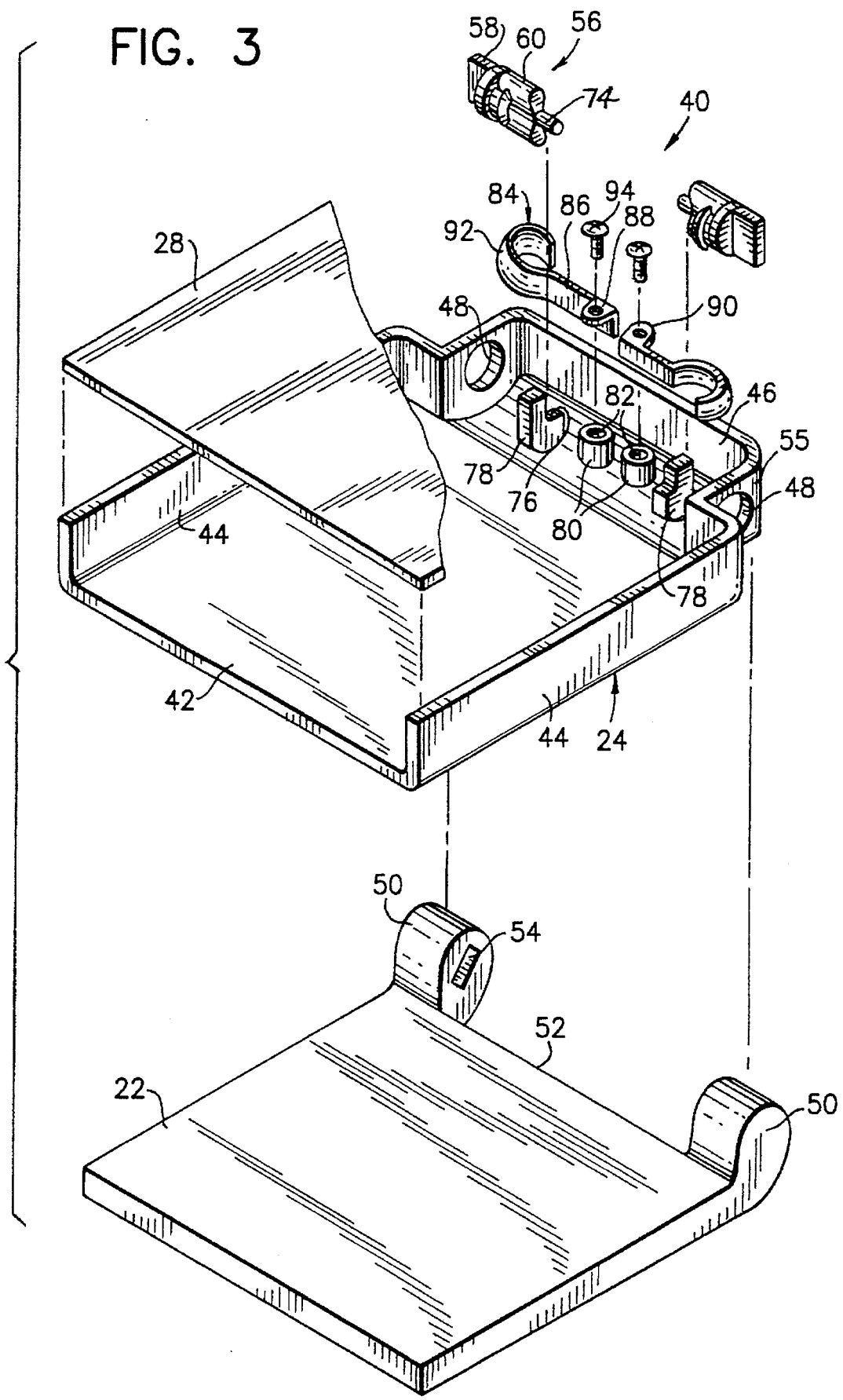
FIG. 3 is a perspective exploded view illustrating specific components of the transceiver of FIGS. 1 and 2 which embody the present invention.

There will first be described a schematic arrangement of a portable transceiver 20 which embodies the present invention with reference to FIGS. 1 and 2. In both FIGS. 1 and 2, an opened condition of a cover 22 of the portable transceiver is depicted. A main body 24 of the portable transceiver is comprised of an upper case 26 and a lower case 28. A receiver section 30 accommodating a speaker therein is provided at an upper end portion of the main body 24. A display section 32 such as a liquid crystal display and a keypad section 34 having a dialing function or the like are provided at a middle portion of the main body 24. A transmitter section 36 accommodating a microphone therein may be provided at a lower end portion of the main body 24. The reason for providing the transmitter section 36 at the lower end portion of the main body 24 is that the distance between the receiver section 30 and the transmitter section 36 is intended to be made as large as possible notwithstanding the fact that the main body 24 is so compact.

Reference numeral 38 denotes an antenna extendably provided at a side portion of the main body 24. The cover 22 is rotatably mounted in the vicinity of the lower end portion of the main body 24. The cover 22 functions to cover at least some of the keypad section 34 when it is in a closed condition, while functioning as a voice reflecting and collection board for the transmitter section 36 when it is in an opened condition. While the cover 22 is rotatably mounted to the main body 24 as mentioned above, it is stably held, in one instance, in a closed position overlying the keypad section 34 indicated by a dash-dot line in FIG. 2 and, in another instance, in an operative position inclined at a predetermined angle with respect to the main body 24 by means of a cover holding mechanism which will be hereinafter described.

Turn now to FIGS. 3–5 for the description of a hinge mechanism 40 for pivotally mounting the cover 22 on the main body 24. The hinge mechanism serves to keep the keypad cover in either the opened or closed position. In a manner to be described, the hinge mechanism also serves to return the cover to a stable (opened) position if the cover is moved beyond that position. The opened position is about 135° from the stable closed position.

The main body 24 includes a base 42, and sidewalls 44 and an endwall 46 upstanding from the base. Opposed aligned mounting bores 48 are formed in the sidewalls 44 adjacent the endwall 46 and each mounting bore is a throughbore.

As noted earlier, the cover 22 is pivotally mounted on the main body 24 for movement between a closed position generally coplanar with and overlying the keypad section 34 and an operative position angularly disposed relative to the main body. The cover includes a pair of spaced apart ears 50 projecting from an end 52 of the cover 22. The ears have opposed key slots 54 formed therein so as to be aligned with the mounting bores 48 in the sidewalls when the cover is attached to the main body. The sidewalls 44 may be recessed as indicated at 55, in order to properly mate with the ears 50 while maintaining the overall rectangular outline for the transceiver 20.

A pair of hinge shafts 56 are rotatably received, each in an associated one of the mounting bores 48 in the sidewalls 44 on the main body. Each hinge shaft includes, at one end, a key member 58 engageable with an associated one of the key slots 54 in the opposed ears 50 for rotation therewith and a central member 60 having a uniformly contoured outer surface defined by elevationally opposed convex shaped lobes 62, laterally opposed concave shaped depressions 64, and smooth transition zones 66 joining the lobes and the depressions.

Each of the hinge shafts 56 further includes a bearing plate 68 intermediate the key member 58 and the central member 60. Additionally, a plurality of resilient locking fingers 70 are fixed to the bearing plate 68 and extend from a plurality of circumferentially spaced locations thereon and at similar radial distances from a longitudinal axis of the hinge shaft 56 in a direction away from the key member. Each of the locking fingers 70 terminates at a transversely extending locking tang 72. Each locking tang has a cam surface 73 (FIG. 5) which is engageable with an associated one of the mounting bores 48 upon insertion of the hinge shaft into an outside end of its associated mounting bore, such that said locking tangs cause said locking fingers to be depressed toward the longitudinal axis of the hinge shaft 56 until they exit from an inside end of the mounting bore. Upon exiting from the mounting bore 48, the locking fingers 70 snap radially outwardly and the locking tangs 72 prevent removal of the hinge shaft from the sidewall 44. Each of the hinge shafts 56 also includes a stub shaft 74 which extends away from the central member 60. The stub shaft 74 is rotatably engageable with a rib bearing surface 76 which will now be described.

A pair of spaced apart integral ribs 78 are upstanding from the base 42, each rib being spaced from an associated one of the sidewalls 44. Each rib also has the bearing surface 76 formed thereon on which the stub shaft 74 is rotatably engaged.

Also viewing FIG. 3, a pair of spaced apart integral support posts 80 upstand from the base 42 intermediate the sidewalls 44 and each of the support posts has a vertically oriented bore 82 therein. A pair of spring members 84 are interposed between the end wall 46 and the central member 60 of each of the hinge shafts 56, in each instance to bias the stub shaft 74 into engagement with the rib bearing surface 76. Each of the spring members 84 includes an elongated shank 86 with a transverse mounting flange 88 at one end thereof having a fastener hole 90 therein and a generally U-shaped resilient biasing portion 92. A fastener 94 which may be a self-threading screw is receivable through the fastener hole 90 in an associated one of the mounting flanges 88 and becomes threadedly engageable with the bore 82 in the associated support post 80 for mounting each spring member 84 to the main body 24. One of the spring members 84 is interposed between the endwall 46 and the contoured outer surface of the central member 60 for holding the stub shaft 74 firmly in engagement with the rib bearing surface 76. The other of the spring members 84 is reversed as is its associated rib 78. In this reversed construction, the biasing portion 92 of the spring member 84 bears against the central member 60 of its associated hinge shaft 56 in the direction of the endwall 46.

The biasing portion 92 of each of the spring members 84 has a convex shaped outer surface which is biased into engagement with the uniformly contoured outer surface of the central member 60 of the hinge shaft 56 for maintaining the cover 22 either in the closed position or in at least one operative position relative to the main body 24.

To complete the description of the construction of the main body 24, viewing FIG. 3 again, it is seen that the lower case 28 is suitably attached to the upstanding sidewalls 44 and endwall 46 in a manner not shown so as to be generally parallel to and spaced from said base. Being so positioned, the cover plate thereby encapsulates the hinge mechanism 40 within the main body 24 to keep it protected and isolated from the elements.

As noted, each of the hinge shafts include a central member 60 which is engaged by the biasing portion 92 of an associated one of the spring members 84. It can be said that the central member 60 is a "peanut" shaped section against which the spring member 84 bears or presses. This spring member associated with each hinge shaft 56 serves to rotate the shaft about its longitudinal axis to either a closed position or to a stable opened position. The closed position is illustrated in FIG. 6C wherein the spring member 84 bears against the transition zone 66 of the central member 60 of the hinge shaft 56 and causes a biasing moment in a counterclockwise direction to hold the cover 22 firmly against the main body 24. As the cover 22 is opened, it passes through a "metastable" position illustrated in FIG. 6B whereat the spring member 84 bears against the lobe 62. With continued rotation of the cover 22, it reaches the operative position illustrated in FIG. 6A which occurs with the cover inclined about 135° with respect to the plane of the main body. With the cover 22 so inclined, each of the spring members 84 is engaged with the depressions 64 of an associated one of the central members 60. The cross sectional shape of the face of the spring member bearing on the hinge shaft is suitably curved to conform to the "peanut" cross section of the hinge shaft.

This arrangement of the curved spring members and "peanut" shaped hinge shaft will provide a more defined feeling to the user when the cover 22 is opened or closed. The forces to close the cover will be greater for a given spring force due to the "peanut" shape. In this manner, a greater opening and closing torque is provided while using a weaker spring.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Hinge apparatus for pivotally connecting a main body and a cover therefor enabling movement of the cover through a range of positions angularly disposed relative to the main body comprising:

shaft means having a longitudinal axis journaled for rotation on the main body at longitudinally spaced locations, said shaft means including key means engageable with the cover for rotation therewith and a central member having a uniformly contoured outer surface defined by elevationally opposed convex shaped lobes, laterally opposed concave shaped depressions, and smooth transition zones joining said lobes and said depressions; and spring means fixed to the main body engageable with said uniformly contoured outer surface of said shaft means, said spring means having a convex shaped surface which substantially engages said concave shaped depressions for maintaining the cover in an operative position relative to the main body when said convex shaped surface is engaged with an associated one of said concave shaped depressions.

2. A transceiver housing comprising:

a main body including a base, and sidewalls and an endwall upstanding from said base and having opposed aligned mounting bores in said sidewalls adjacent said endwall, each mounting bore extending from an outside end to an inside end;

a cover pivotally mounted on said main body for movement between a closed position generally coplanar with and overlying said main body and an operative position angularly disposed relative to said main body, said cover including a pair of spaced apart ears projecting from an end thereof, said ears having opposed key slots formed therein being aligned with the mounting bores in said sidewalls;

a pair of hinge shafts, each said hinge shaft having a longitudinal axis rotatably received in an associated one of the mounting bores in said sidewalls on said main body, each said hinge shaft including a key member engageable with an associated one of the key slots in said opposed ears for rotation therewith and a central member having a uniformly contoured outer surface defined by elevationally opposed convex shaped lobes, laterally opposed concave shaped depressions, and smooth transition zones joining said lobes and said depressions; and a pair of spring members fixed to said main body biased into engagement with said uniformly contoured outer surface of said shaft means, each of said spring members having a convex shaped surface which substantially engages said concave shaped depressions for maintaining said cover in an operative position relative to said main body when said convex shaped surface is engaged with an associated one of said concave shaped depressions.

3. A transceiver housing as set forth in claim 2 wherein said operative position occurs with said cover inclined about 135° with respect to said main body, each said convex shaped surface of said spring members being engaged with said depressions of an associated one of said central members.

4. A transceiver housing as set forth in claim 2 wherein said main body has a pair of spaced apart integral ribs upstanding from said base, each said rib being spaced from an associated one of said sidewalls and having a bearing surface thereon;

wherein each of said hinge shafts includes a bearing plate intermediate said key member and said central member, a plurality of resilient locking fingers fixed to said bearing plate and extending from a plurality of circumferentially spaced locations thereon and at similar radial distances from said longitudinal axis in a direction away from said key member, each of said locking fingers terminating at a transversely extending locking tang, each said locking tang having a cam surface engageable with an associated one of the mounting bores upon insertion of said hinge shaft into an outside end of its associated mounting bore, such that said locking tangs cause said locking fingers to be depressed toward said longitudinal axis until they exit from an inside end of the mounting bore whereupon said locking fingers snap radially outwardly and said locking tangs prevent removal of said hinge shaft from said sidewall, each of said hinge shafts including a stub shaft extending away from said central member, said stub shaft being rotatably engageable with said rib bearing surface;

said spring members positioned to bias said stub shaft into engagement with said rib bearing surface.

5. A transceiver housing as set forth in claim 4 wherein said main body has a pair of spaced apart integral support posts upstanding from said base, wherein said posts are intermediate said sidewalls, each of said support posts having a bore therein;

wherein each of said spring members includes an elongated shank with a transverse mounting flange at one end thereof having a fastener hole therein, and a generally U-shaped resilient biasing portion interposed between said endwall and said contoured outer surface of said central member for holding said stub shaft firmly in engagement with said rib bearing surface; and including a fastener receivable through the fastener hole in an associated one of said mounting flanges and threadedly engageable with the bore in said associated support post for mounting each said spring member to said main body.

6. A transceiver housing as set forth in claim 2 wherein said main body includes a lower case attached to said upstanding sidewalls and endwall and generally parallel to and spaced from said base; and wherein said cover overlies and is generally contiguous to said main body when in a closed position, each of said spring members being engaged with one of said lobes of an associated one of said central members such that a closing torque is applied to said hinge shafts, biasing said cover to the closed position.

7. Hinge apparatus comprising:

a main body including a base, and sidewalls and an endwall upstanding from said base and having opposed aligned mounting bores in said sidewalls adjacent said endwall; and a cover pivotally mounted on said main body for movement between a closed position generally coplanar with and overlying said main body and through a range of positions angularly disposed relative to said main body;

shaft means having a longitudinal axis journaled for rotation on the main body at longitudinally spaced locations, said shaft means including key means engageable with the cover for rotation therewith and a central member having a uniformly contoured outer surface defined by elevationally opposed convex shaped lobes, laterally opposed concave shaped depressions, and smooth transition zones joining said lobes and said depressions; and spring means fixed to the main body engageable with said uniformly contoured outer surface of said shaft means, said spring means having a convex shaped surface which substantially engages said concave shaped depressions for maintaining the cover in an operative position relative to the main body when said convex shaped surface is engaged with an associated one of said concave shaped depressions.

8. Hinge apparatus as set forth in claim 7 wherein said cover includes a pair of spaced apart ears projecting from an end thereof, said ears having opposed key slots formed therein being aligned with the mounting bores in said sidewalls; and wherein said shaft means includes a pair of hinge shafts, each said hinge shaft having a longitudinal axis rotatably received in an associated one of the mounting bores in said sidewalls on said main body, each said hinge shaft including a key member engageable with an associated one of the key slots in said opposed ears for rotation therewith.

9. Hinge apparatus as set forth in claim 7 wherein said main body includes a cover plate attached to said upstanding sidewalls and endwall and is generally parallel and spaced from said base; and wherein said operative position occurs with said cover inclined about 135° with respect to said main body, each said convex shaped surface of said spring members being engaged with said depressions of an associated one of said central members.

10. Hinge apparatus as set forth in claim 7 wherein said main body has a pair of integral ribs upstanding from said base, each of said ribs being spaced from an associated one of said sidewalls and having a bearing surface thereon;

wherein each of said hinge shafts includes a bearing plate intermediate said key member and said central member, a plurality of resilient locking fingers fixed to said bearing plate and extending from a plurality of circumferentially spaced locations thereon and at similar radial distances from said longitudinal axis in a direction away from said key member, each of said locking fingers terminating at a transversely extending locking tang, each said locking tang having a cam surface engageable with an associated one of the mounting bores upon insertion of said hinge shaft into an outside end of its associated mounting bore, such that said locking tangs cause said locking fingers to be depressed toward said longitudinal axis until they exit from an inside end of the mounting bore whereupon said locking fingers snap radially outwardly and said locking tangs prevent removal of said hinge shaft from said sidewall, each of said hinge shafts including a stub shaft extending away from said central member, said stub shaft being rotatably engageable with said rib bearing surface;

each said spring being interposed between said end wall and said associated central member to bias said associated stub shaft into engagement with said associated rib bearing surface.

11. Hinge apparatus as set forth in claim 10 wherein said main body has a pair of spaced apart integral support posts upstanding from said base, wherein said posts are intermediate said sidewalls, each of said support posts having a bore therein;

wherein each of said spring members includes an elongated shank with a transverse mounting flange at one end thereof having a fastener hole therein, and a generally U-shaped resilient biasing portion interposed between said endwall and said contoured outer surface of said central member for holding said stub shaft firmly in engagement with said rib bearing surface; and including a fastener receivable through the fastener hole in an associated one of said mounting flanges and threadedly engageable with the bore in said associated support post for mounting each said spring member to said main body.

12. Hinge apparatus as set forth in claim 7 wherein said main body includes a lower case attached to said upstanding sidewalls and endwall and generally parallel and spaced from said base; and wherein said cover overlies and is generally contiguous to said main body when in a closed position, each of said spring members being engaged with one of said lobes of an associated one of said central members such that a closing torque is applied to said hinge shafts, biasing said cover to the closed position.

* * * * *